(No Model.) 6 Sheets—Sheet 4.
W. W. DOOLITTLE.
FACING MACHINE.
No. 572,599. Patented Dec. 8, 1896.
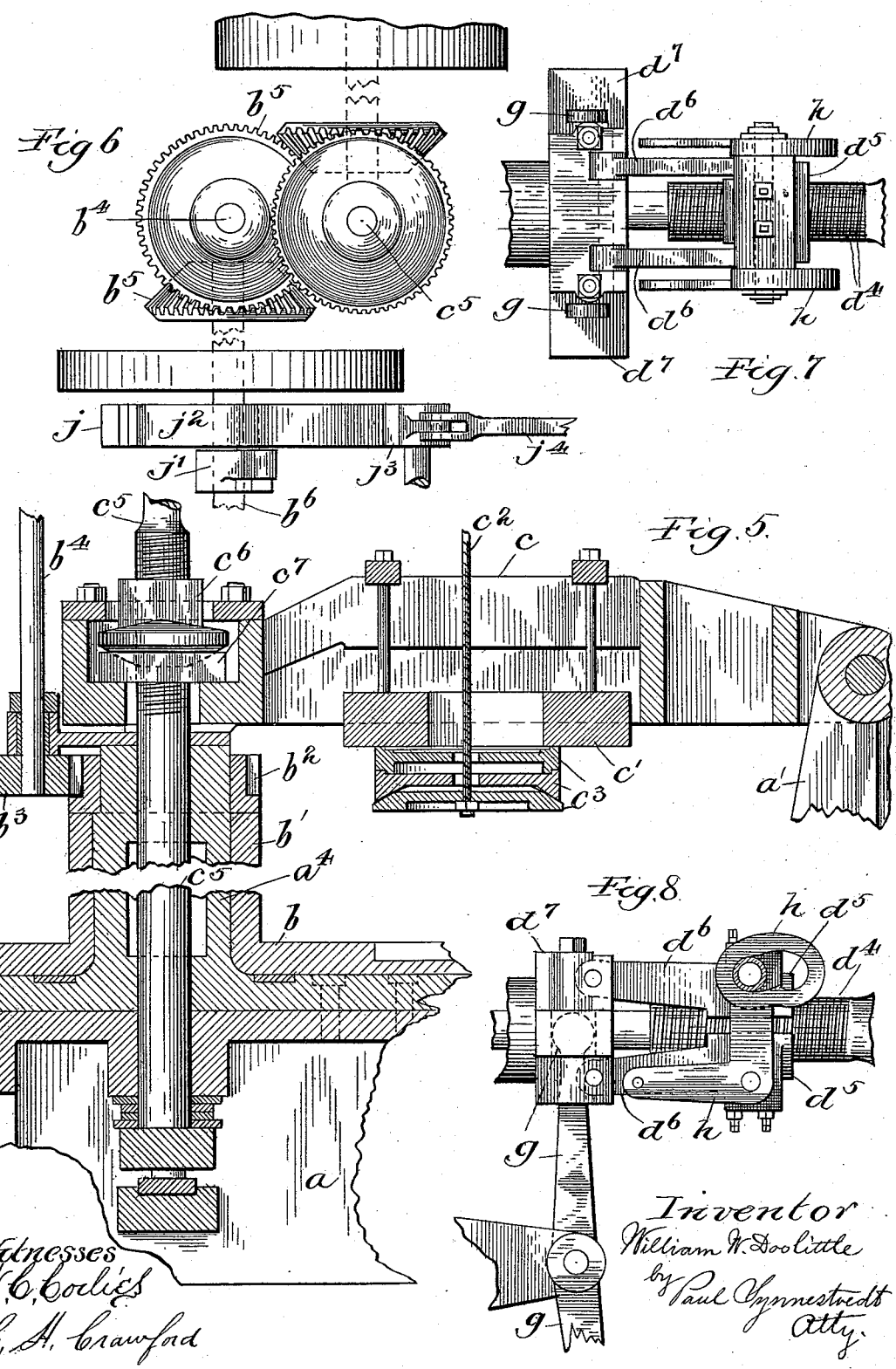
Witnesses
W. C. Coolies
C. A. Crawford
Inventor
William W. Doolittle
by Paul Synnestvedt
Atty.

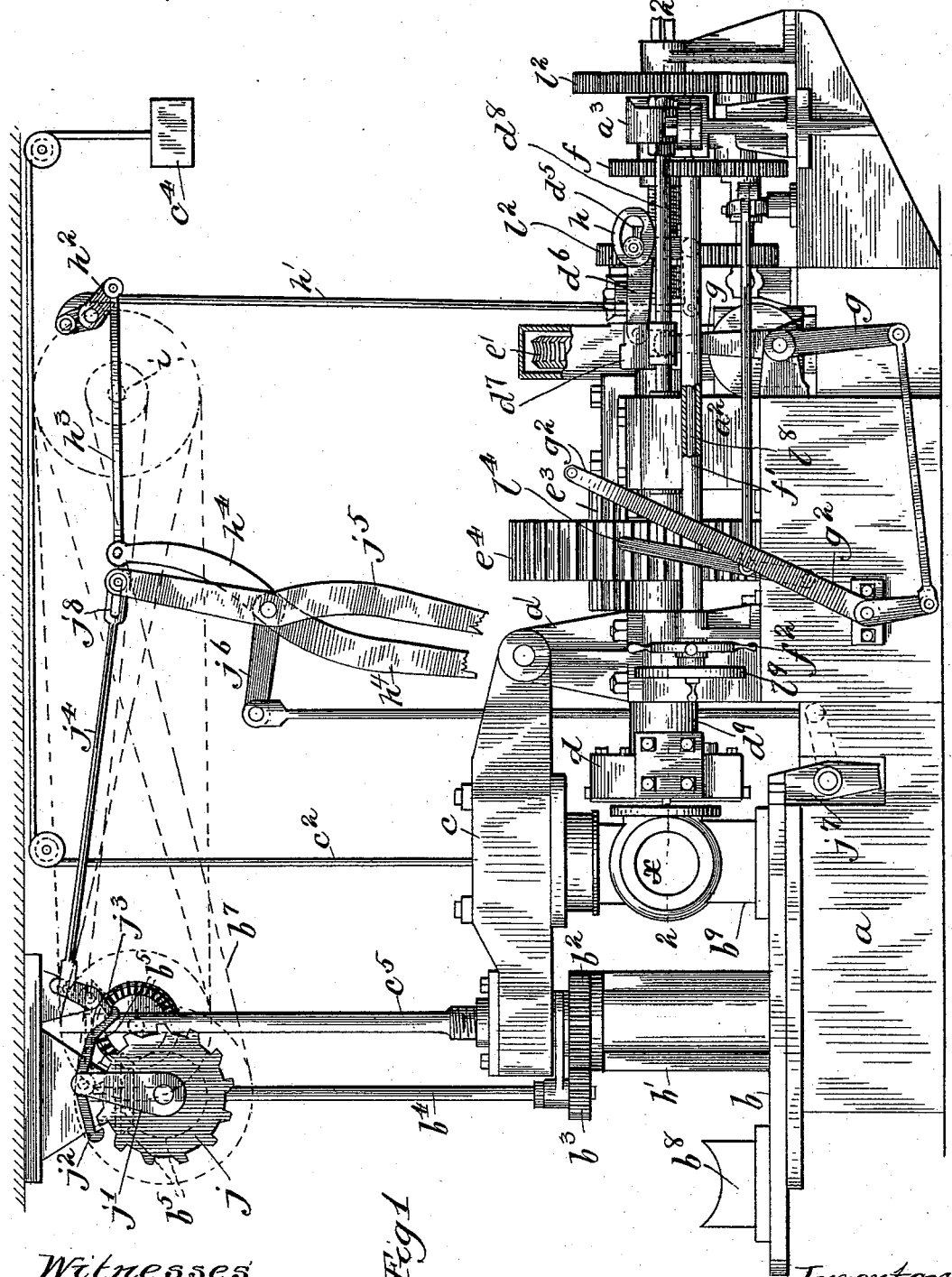

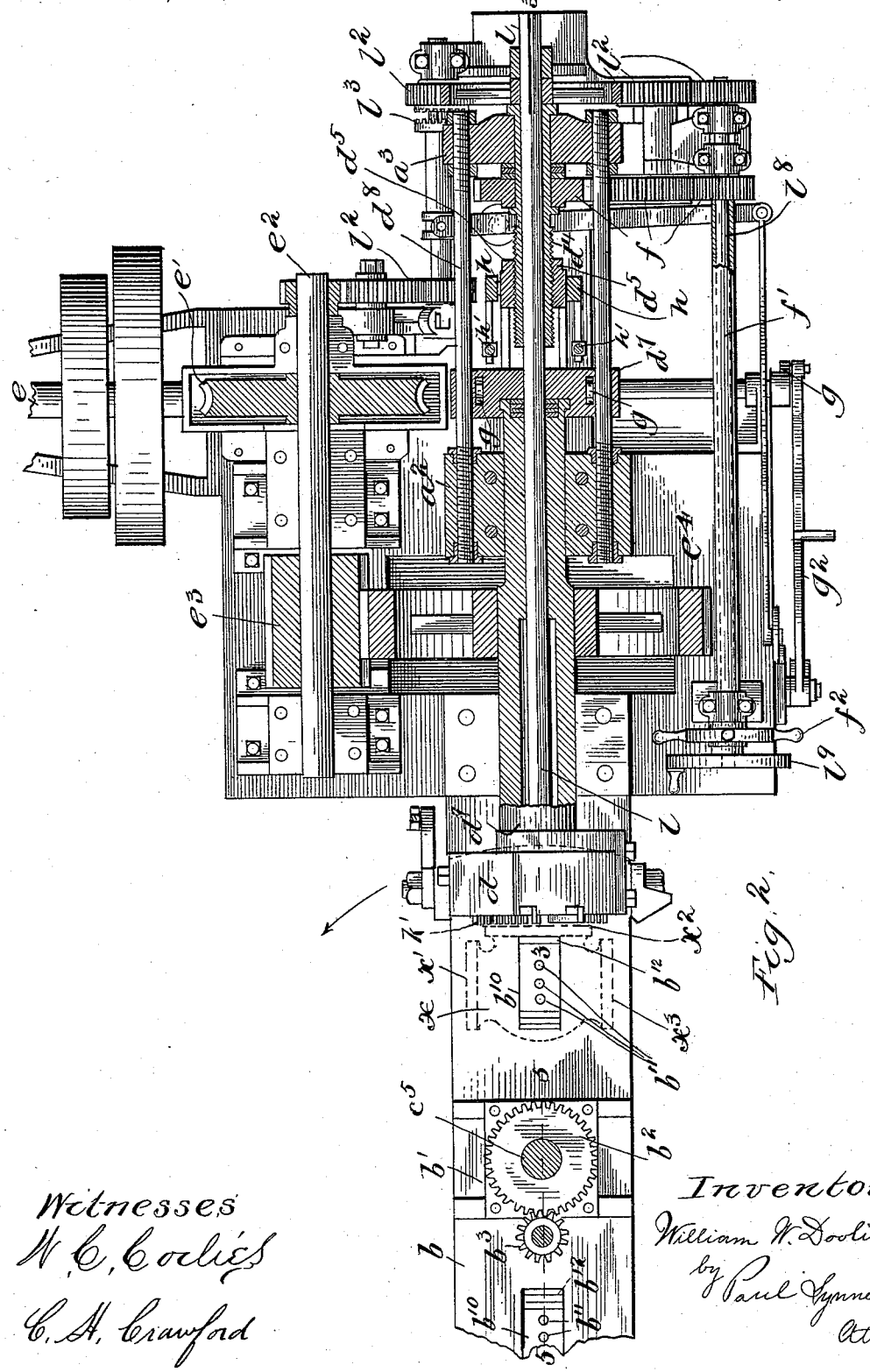

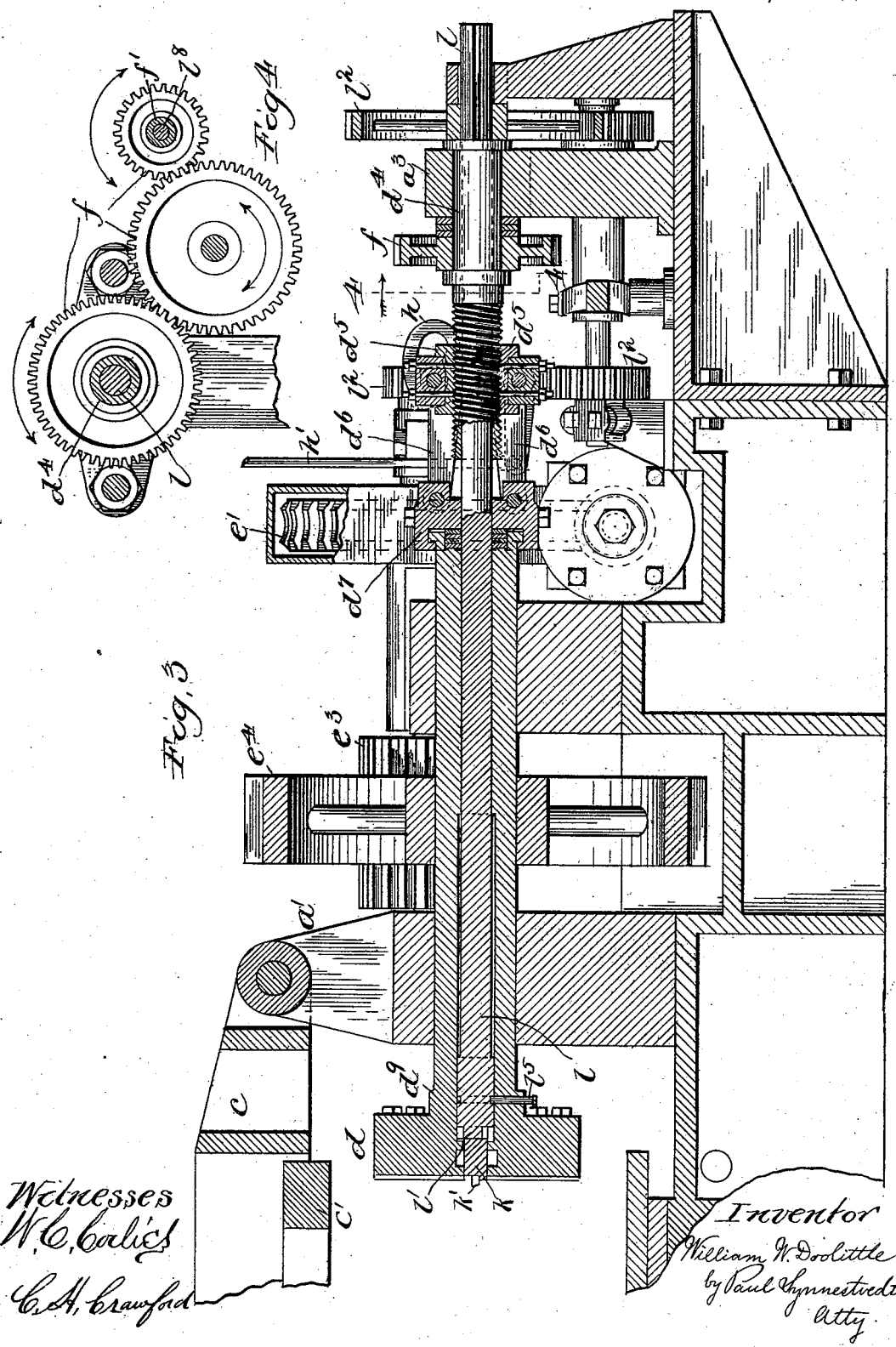

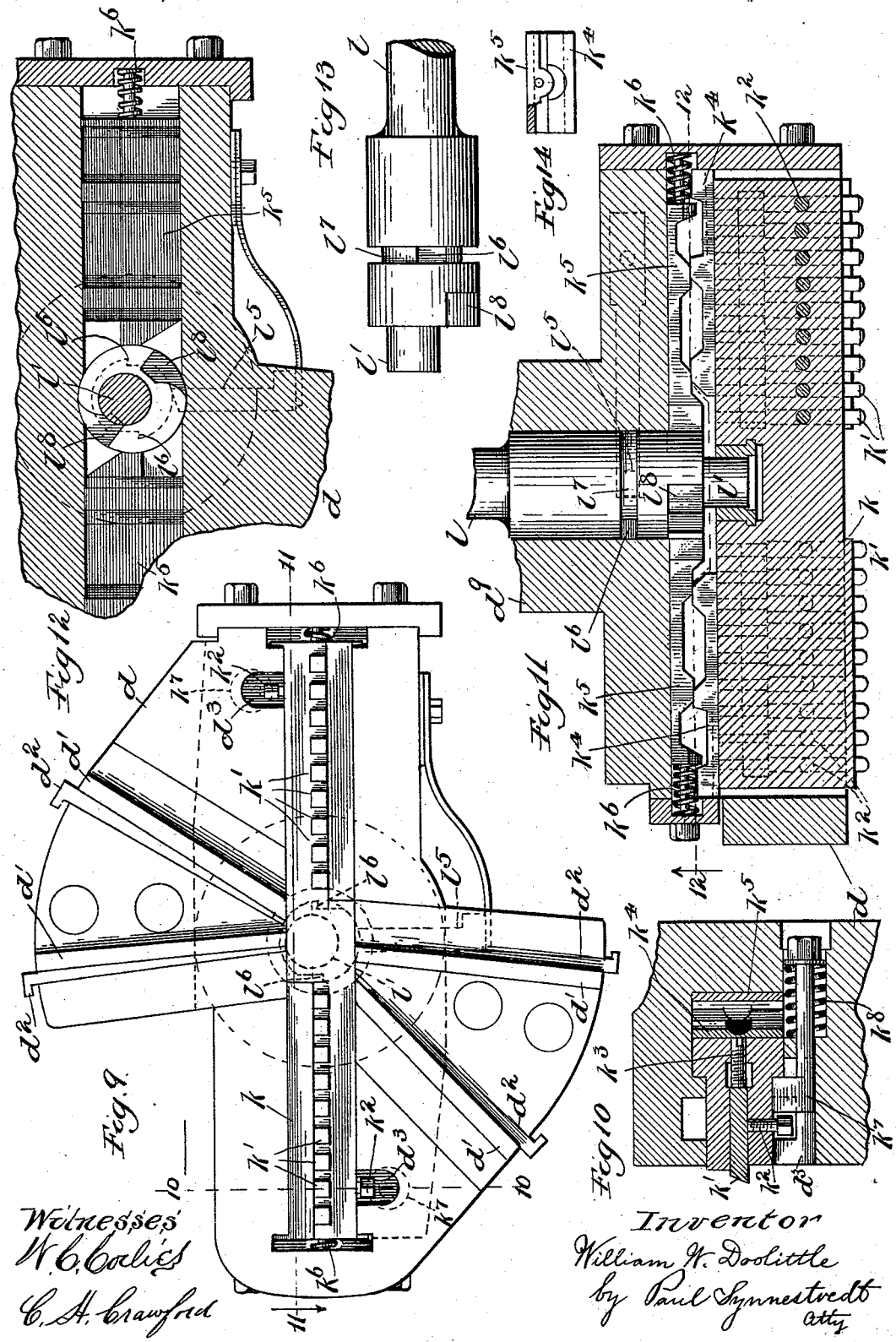

(No Model.) 6 Sheets—Sheet 6.
W. W. DOOLITTLE.
FACING MACHINE.
No. 572,599. Patented Dec. 8, 1896.
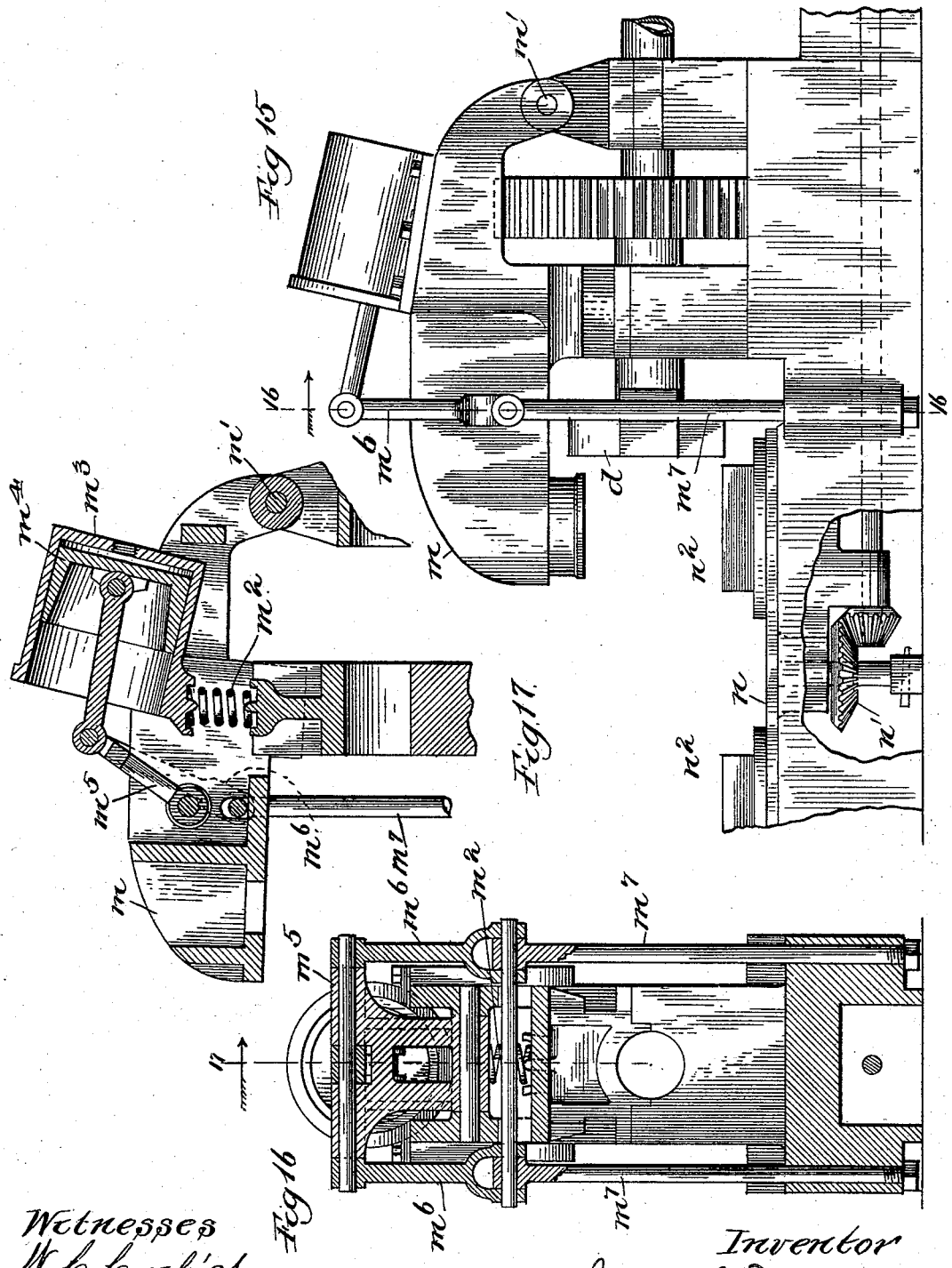

UNITED STATES PATENT OFFICE.

WILLIAM W. DOOLITTLE, OF CHICAGO, ILLINOIS, ASSIGNOR TO THE CRANE COMPANY, OF SAME PLACE.

FACING-MACHINE.

SPECIFICATION forming part of Letters Patent No. 572,599, dated December 8, 1896.

Application filed April 11, 1896. Serial No. 587,215. (No model.)

*To all whom it may concern:*

Be it known that I, WILLIAM W. DOOLITTLE, a citizen of the United States, residing in Chicago, in the county of Cook and State of Illinois, have invented certain new and useful Improvements in Facing-Machines, of which the following, taken in connection with the accompanying drawings, is a specification.

My invention relates to that class of machines which are used to turn or face surfaces of metal, such, for example, as the flanges of valves or other pipe-fittings.

The object of my invention is to reduce the time, and consequently the cost, of doing work of this class below the minimum secured by constructions heretofore proposed, and this I aim to accomplish without any deterioration in the quality and uniformity of the work done.

To the accomplishment of the above-mentioned objects my invention consists in certain novel combinations of mechanism and groups of mechanism, as will be specifically pointed out in the claims, and which I shall now proceed to describe in detail, reference being had to the accompanying drawings, in which—

Figure 1 is a side elevation of a machine embodying my improvements. Fig. 2 is a horizontal section on the line 2 2 of Fig. 1. Fig. 3 is a vertical section on the line 3 3 of Fig. 2. Fig. 4 is a detail view of a part of the driving mechanism, taken on the line 4 4 of Fig. 3. Fig. 5 is an enlarged section on the line 5 5 of Fig. 2. Fig. 6 is a detail of some of the overhead mechanism. Figs. 7 and 8 show a plan and elevation, respectively, of a split nut which is used to clamp and release the main shaft. Figs. 9, 10, 11, 12, 13, and 14 are views showing the cutter-head and its detail parts. Figs. 15, 16, and 17 are three views of a modified arrangement of clamping device for holding the work.

Throughout the drawings like parts are designated by the same reference-characters.

As a foundation on which to construct the rest of the machine I provide a main casting or bed $a$. On one end of this I erect a rotating table $b$ to support the work, and over this table I provide an arm or clamp $c$ for securely holding the work in place. This arm is pivoted at one end to an upwardly-extending bracket $a'$, which latter serves as a bearing for one end of a shaft $d^9$, which carries a cutter-head $d$, the other end of the shaft being journaled in another upwardly-extending bracket or pillow-block $a^2$.

At the back of the main body of the machine is arranged the main driving-shaft $e$, which operates to rotate the cutter-head $d$ through the worm-gear $e'$, shaft $e^2$, and spur-gears $e^3$ and $e^4$, the first of which, $e^3$, is made of wider face than the second to allow of an endwise movement of the cutter-head without disengagement of the gears. On the right end of the shaft $d^9$ is arranged a cross-head $d^7$, adapted to slide along the rods $d^8$, which connect the bracket $a^2$ with another bracket or pillow-block, $a^3$. The rods $d^8$ perform the double function of guiding the cross-head and taking the strain from the bracket $a^3$ when the cutter-head is forced up toward the work. Journaled in the bracket $a^3$ is a shaft $d^4$, which, by screw-threaded engagement with the split nut, and the links $d^6$, transfers an endwise motion to the shaft $d^9$ and its connected cutter-head $d$ whenever the shaft $d^4$ is rotated. To accomplish the rotation of the shaft $d^4$, I provide a train of gears $f$, (shown in detail in Fig. 4,) which, through the hollow rod $f'$, is adapted to be operated by means of the handle-wheel $f^2$.

As it is desirable to be able to move the cutter-head $d$ up to and out of operative position more rapidly than can be done by the rotation of the shaft $d^4$, I provide for that purpose a quick-motion lever $g$ and connected handle $g^2$ (the former engaging with a groove in the cross-head $d^7$) and a device for releasing or separating the split nut $d^5$, so as to disengage the screw on the shaft $d^4$. This device (see Figs. 7 and 8) comprises a pair of cam-levers $h$, a rocker-shaft $h^2$, handle $h^4$, and connecting-rods $h'$ and $h^3$.

Referring now for awhile to Fig. 5, I will describe more in detail the operation of the table $b$. Rigidly secured to the bed $a$ is attached a bearing $a^4$, about which the table $b$ is arranged to turn. At the upper end of the hub $b'$ of the table is formed a gear $b^2$, engaging with which is another gear, $b^3$, made of one-half the diameter of the gear $b^2$, so that the table will make but one-half a revolution at each complete revolution of the vertical shaft $b^4$. On the upper end of the vertical shaft are two bevel-gears $b^5$, (see Fig. 6,) which receive their motion from a shaft $b^6$, which in turn is driven by a belt $b^7$ from the overhead power-shaft $i$, Fig. 1. As the belt $b^7$ is in constant motion, and as it is only desired to rotate the table $b$ at such intervals as the work to be operated upon is to be changed, I provide a ratchet-wheel $j$, which turns with the pulley over which the belt $b^7$ runs, and outside of this ratchet-wheel I arrange an arm $j'$, carrying a pawl $j^2$, adapted to engage the teeth on the wheel $j$. At one end of the pawl $j^2$ is arranged a trigger $j^3$, connected by a rod $j^4$ with a hand-lever $j^5$, to which latter, by means of a rocker-shaft, is also attached a lever $j^6$ for locking and unlocking the catch $j^7$, which holds the table $b$ in position. At the point where the lever $j^5$ engages the rod $j^4$ I provide a slot $j^8$, which is of sufficient length to permit the first movement of the handle $j^5$ to unlock the catch $j^7$ before the trigger $j^3$ is affected. If now it be desired to rotate the table $b$, the lever $j^5$ is moved to the right. This unlocks the catch $j^7$, disengages the trigger $j^3$, and permits the pawl $j^2$ to engage with the sprocket-wheel $j$, carrying the arm $j'$ around until the tail of the pawl $j^2$ again encounters the trigger $j^3$, when it releases its engagement, making one complete revolution of the sprocket-wheel and its connected vertical shaft and resulting in just a half-revolution of the table $b$, because of the proportion of the gears $b^2$ and $b^3$.

On opposite sides of the table $b$ I arrange auxiliary rotating tables $b^8$ and $b^9$, these being seated in oblong blocks $b^{10}$, resting in an oblong socket in the table $b$. In these oblong blocks are a series of holes $b^{11}$ to facilitate adjustment of the face of the work to the cutting-tool, it being only necessary when it is desired to place work in the machine which will stand nearer to or farther from the cutter-head to change the auxiliary table from one hole to another or to shift the oblong box endwise within its groove, and to the better secure it in any position in which it may be placed I provide a set of liners $b^{12}$, which may be moved to either end of the block, as desired. It will be further noticed from the drawings that the holes $b^{11}$ are arranged nearer one end of the block than the other, and this is another provision for facilitating the ready adjustment of different sizes and kinds of work, as a mere reversal of the block in its socket will change the distance of the various holes relative to the cutter-head. Although I have shown just two auxiliary rotating tables, it is obvious that a single one, or three, four, or even more, could be used, if desired.

Referring now again more particularly to Fig. 5, I will proceed to explain my arrangement of devices for clamping the work in place. On the under side of the arm $c$ I arrange a bearing-plate $c'$, through a large hole in the center of which passes a cord or rod $c^2$, at the lower end of which is suspended a series of washers $c^3$ to permit of ready adjustment of the lowermost washer to suit the work to be held. Where the lowermost washer bears against the one immediately above it, I provide a universal joint. An extension of the cord $c^2$ passes by overhead pulleys to a weight $c^4$, for the purpose of holding the washers $c^3$ in place when the work is being moved.

The bearing-plate $c'$ and the hole in its center, through which the cord $c^2$ passes, are made of greater length than width to permit of a considerable movement of the washers toward or away from the cutter-head, as may prove necessary. To move the arm $c$ up or down, I provide at its left extremity a vertical power-shaft $c^5$, connected with a countershaft overhead, having open and crossed belts and shifting mechanism substantially the same as is used on reversible lathes, and which, as it could be readily replaced by any other convenient method of reversing the motion of the vertical shaft $c^5$, I have not illustrated in detail further than is shown in the plan view, Fig. 6, and the dotted lines in Fig. 1. To transfer the pressure of the nut $c^6$ to the lever $c$, I provide a washer $c^7$, having, preferably, a kind of conical or ball-joint socket to insure a substantial bearing contact.

Passing now to Figs. 9, 10, 11, 12, 13, and 14, showing the cutter-head in detail, I will next proceed to describe its construction and mode of operation. Fig. 9 shows the front face of the cutter-head. Fig. 10 is a cross-section taken on the line 10 10 of Fig. 9. Fig. 11 is a section taken on the line 11 11 of Fig. 9, and Fig. 12 is a section taken on the broken line 12 12 of Fig. 11.

Within the cutter-head proper, $d$, and projecting a slight distance from the face thereof are four finishing or smoothing tools $d'$, held securely in place by four taper-keys $d^2$.

Operating in a groove extending transversely across the face of the cutter-head is a cutter-bar $k$, socketed in which is a row or gang of cutters $k'$, held in place by set-screws $k^2$ and $k^3$, the latter of which are for the purpose of adjusting the amount of projection of the cutters beyond the face of the cutter-bar. In order to allow the ridges in the work between the individual cutters to be roughly turned off before the finishing-tools are brought into operation, the cutter-bar is adapted to receive a transverse or radial motion within its groove in the cutter-head. To secure this radial motion, I provide within the shaft or spindle $d^9$, which carries the cutter-head, an interior shaft $l$, having on its extreme end a pin $l'$, placed eccentrically with the axis of the spindle $d^9$ and so arranged that the interior shaft $l$ may be rotated more rapidly than the spindle $d^9$. To secure this more rapid rotation of the interior shaft, I provide at its right-hand end a series of gears $l^2$, (see Figs. 1 and 2,) adapted to be thrown into or out of engagement with the worm-wheel shaft $e^2$ by means of a shifting-clutch $l^3$ whenever the hand-lever $l^4$ is moved by the operator. When the clutch $l^3$ is disengaged, the interior shaft $l$ may be rotated as desired by hand through the rod $l^8$, which is connected at one end with the train of gears $l^2$ and at the other end with the wheel $l^9$.

While I have proportioned the gears $l^2$ so that they will rotate the interior shaft a little more rapidly than the spindle turns, it is obvious that the same result (i. e., the radial feed of the cutter-bar $k$) could be obtained by so proportioning the gears $l^2$ that the interior shaft would revolve more slowly than the spindle. As it is desirable that the cutter-bar should not move radially while the first roughing cut on the work is being made, and as the friction alone (the clutch $l^3$ of course being out of action) might not be sufficient to prevent this, I arrange a spring key or pawl $l^5$, passing through the cutter-head $d$ and seating in a notch $l^6$ in the shaft $l$, its end being beveled in direction to permit rotation of the interior shaft more rapidly than the surrounding spindle, but not vice versa. In Fig. 13 at $l^7$ is shown the groove in which this spring-key travels.

It is of course necessary that there should be means provided for permitting the cutter-bar and its contained gang of roughing-cutters to be drawn into the head beyond the plane of operation of the facing or finishing cutters when it is desired to bring the latter into action, and to this end I provide a set of wedges $k^4$ and $k^5$, which form a support or backing for the cutter-bar $k$. Two of these wedges, $k^4$, rest against the cutter-bar and are held against endwise movement by projections engaging with sockets in the cutter-head. The other two are arranged to slide in a groove immediately behind the first two and are held constantly pressed against the interior shaft by springs $k^6$. On the end of the shaft $l$ I provide notches $l^8$, adapted to engage the ends of the movable wedges $k^5$. (See Fig. 12.)

In Fig. 14 I have shown an end view of the two wedges to bring out more clearly the arrangement of the semicylindrical socket, in which the springs $k^6$ are housed.

Referring now particularly to Fig. 10, I will describe an arrangement by which I secure the automatic collapse of the roughing-cutter bar after it has reached the limit of its transverse feed. Engaging with the flange of the cutter-bar is a bolt $k^7$, which, by means of a spring $k^8$, draws the cutter-bar back into the cutter-head as soon as the wedges $k^4$ and $k^5$ have reached a position in which this is possible. Two of these bolts are employed, resting in the sockets $d^3$, one being on each side of the cutter-bar.

It is sometimes desirable to be able to put work in this machine which is longer than can be held under the clamping-lever $c$. To permit of this, I have designed another form of holding mechanism, which I illustrate in Figs. 15, 16, and 17, Fig. 16 being a section taken on the line 16 16 of Fig. 15 and Fig. 17 being a section taken on the line 17 17 of Fig. 16. In these views the clamping-lever $m$ is pivoted at $m'$ and overhangs the cutter-head and edge of the table, and the table $n$ is adapted to be moved by a bevel-gear $n'$ under its center, the overhead connections previously shown being removed. On the table $n$ are placed two auxiliary rotating tables $n^2$, on which the work rests, these being provided for the purpose of permitting the different sides of the work to be presented to the machine without its being taken out from under the lever $m$.

The lever $m$ is arranged to be held up by the spring $m^2$, and on its upper side I place a cylinder $m^3$, having within it a piston $m^4$, connecting with a toggle-lever $m^5$ $m^6$, the longer arms $m^6$ of which are secured to the bed of the machine by the rods $m^7$. By the use of this cylinder and the toggle-joint, connected as described, I am enabled to operate the clamping-arm by any conveniently-obtained fluid pressure, either air, steam, or hydraulic, and to thus still further facilitate the operation of the machine as a whole.

The operation of my machine is as follows: Let X represent a piece of work having three surfaces X', $X^2$, and $X^3$ on which it is desired to operate. This is placed on the table $b^9$, which is then at the outer end of the machine, and the lever $j^5$ is moved to release the catch $j^7$ and the pawl $j^2$, when the arm $j'$ makes one revolution, turning the table half-way round and bringing the parts to the position shown in Fig. 1. The washers $c^3$ are now properly adjusted above the work and the shifting lever, which rotates the shaft $c^5$, is moved, causing the lever $c$ to descend and clamp the work firmly in place. By means of the quick-motion lever $g$ the cutter-head $d$ is brought up close to the face to be turned. The split nut $d^5$ is now brought into engagement with the thread $d^4$ and the roughing-cutters $k'$ are forced into the work by turning the hand-wheel $f^2$, the cutter-head $d$ of course being meanwhile rotated by the main driving-shaft $e$ and the worm-gear $e'$ and the spur-gears $e^3$ and $e^4$. This, as will be readily seen, takes off the rougher surface of the work, but leaves a series of concentric ridges about the center of rotation. When the proper depth of cut has been roughed out, the lever $l^4$ is moved to throw the clutch $l^3$ into engagement, and this, through the gears $l^2$ and the rod $l$, imparts to the gang of roughing-cutters and the cutter-bar $k$ a radial feed, the wedges $k^4$ and $k^5$ supporting the bar against the resistance of the cut in the position shown in the drawings, Fig. 11, until it has reached the limit of its motion, at which point the movable wedges $k^5$ drop into the notches $l^8$, and the cutter-bar is automatically retracted from the work by means of the bolts $k^7$ and the springs $k^8$. The cutter-head is now further advanced to bring the smoothing or finishing cutters $d'$ up against the work, and by them the cutting operation is completed.

After one face is finished the auxiliary table is turned to bring another face into position, (the clamping-lever $c$ being of course loosened to permit this by means of the reverse movement of the vertical shaft $c^5$,) the cutter-head $d$ being moved back out of the way by the quick-motion lever $g$, the split nut $d^5$ being opened to allow this to be done. To project the gang of roughing-cutters again into operative position preparatory to the commencement of another cut, the interior shaft $l$ is rotated by the hand-wheel $l^9$, the inclines on the wedges $k^4$ and $k^5$ forcing the cutter-bar $k$ out to the position shown in Fig. 11.

While the cutting of one piece of work has been progressing, another has been put in place on the other auxiliary table $b^8$, and as soon as the first piece is completed the table is rotated to bring the second under the clamping-arm $c$.

Having thus described my invention, what I claim as new, and desire to secure by Letters Patent, is—

1. In a facing-machine the combination with a main casting or bed, carrying a cutter-head, of a rotating table resting thereon, and one or more auxiliary tables rotatably pivoted on said rotating table, and having their axes of rotation at right angles to the axis of said cutter-head, substantially as described.

2. In a facing-machine the combination with a rotating cutter-head, a casting or bed, and a rotating table resting on said casting or bed, of a power clamping-arm extending above said rotating table and said cutter-head, substantially as shown and described.

3. In a facing-machine, the combination with a cutter-head, a rotating table, having its axis at right angles to the axis of said cutter-head, power devices for turning said table, and a catch for holding the same in place, of a single handle whereby said catch is released and said power-turning devices are thrown into action, substantially as described.

4. In a facing-machine the combination with a rotating table, and an auxiliary table pivoted thereon, and a cutter-head having its axis at right angles to said tables, of an adjusting device for varying the position of said auxiliary table, substantially as described.

5. In a facing-machine the combination with a clamping-arm and an auxiliary table, of a bearing-plate laterally adjustable relative to said auxiliary table, substantially as described.

6. In a facing-machine the combination with a clamping-arm and a bearing-plate; of a series of washers whereby said bearing-plate may be vertically adjusted relative to said clamping-arm, and a universal joint between the adjacent faces of two of said washers, substantially as described.

7. In a facing-machine the combination with a rotatable table of a clamping-arm, and mechanism for operating the same comprising a threaded shaft operated by reversible gearing, substantially as described.

8. In a facing-machine the combination with a cutter-head, of a cutter-bar, containing a gang of cutters, and mechanism for imparting to said cutters a lateral feed, substantially as described.

9. In a facing-machine the combination with a gang of cutters, of mechanism, whereby said cutters are forced into the work, and mechanism whereby said cutters are given a lateral feed, substantially as shown and described.

10. In a machine for facing surfaces of metal, the combination with a cutter-head, of a cutter-bar containing a gang of cutters, mechanism for forcing said cutters into the surface to be faced, and mechanism for imparting to said cutters a lateral feed, substantially as described.

11. In a facing-machine the combination with a cutter-head, of a gang of roughing-cutters, a series of smoothing-cutters, both carried by said head, and mechanism, substantially as described, whereby said gang of roughing-cutters is adapted to be retracted to permit the smoothing-cutters to be brought into operation.

12. In a facing-machine the combination with a cutter-head, of a bar containing a gang of cutters, devices whereby said bar may be projected into or retracted from operative position, mechanism substantially as described, for actuating said devices, and means separate from said projecting devices for feeding the cutters into the work.

13. In a machine for facing surfaces of metal, the combination with a cutter-head and spindle for turning the same, of a cutter-bar containing a gang of cutters, and a shaft within said spindle adapted to impart to said cutter-bar a radial feed, substantially as described.

14. In a facing-machine, the combination with a cutter-head and spindle for turning the same, of a cutter-bar containing a gang of cutters, and a shaft within the spindle adapted to impart to said bar a radial feed, by movement at a speed varying from the rapidity of rotation of the spindle itself, substantially as described.

15. In a facing-machine the combination with a cutter-head, of a gang of cutters, mechanism for imparting to said cutters a radial feed, and mechanism for retracting said cutters out of operative position automatically after the completion of the radial feed, substantially as described.

16. In a facing-machine the combination with a cutter-head, a spindle for turning the same, and a feed-screw coacting with said spindle, of a split nut engaging said feed-screw, and a quick-motion lever for rapidly moving said cutter-head up to and out of operative position, substantially as described.

17. In a facing-machine the combination of a cutter-head, a spindle for turning the same, a bar containing a gang of cutters, power mechanism for imparting to said bar a radial feed, a clutch for throwing said last-named mechanism into and out of operation, and devices whereby said radial feed may be operated by hand when said power mechanism is thrown out of engagement by said clutch, substantially as described.

WILLIAM W. DOOLITTLE.

Witnesses:
 JOHN CONWAY,
 ROBERT GANFORD.